United States Patent [19]
Ratliffe

[11] Patent Number: 5,915,942
[45] Date of Patent: Jun. 29, 1999

[54] MULTI-FUNCTIONAL FISHING ROD HOLDER

[76] Inventor: Hallie C. Ratliffe, 4000 Sheringham Rd., Richmond, Va. 23236-1221

[21] Appl. No.: 09/030,194

[22] Filed: Feb. 25, 1998

[51] Int. Cl.⁶ .................................................. A01K 97/10
[52] U.S. Cl. .......................... 43/21.2; 224/269; 224/251; 224/272
[58] Field of Search .............................. 43/21.2; 224/200, 224/269, 251, 271, 272

[56] References Cited

U.S. PATENT DOCUMENTS

| | | | |
|---|---|---|---|
| 4,172,543 | 10/1979 | Fischer | 224/268 |
| 4,297,802 | 11/1981 | Normann | 43/4 |
| 5,232,137 | 8/1993 | Devine | 224/252 |
| 5,617,980 | 4/1997 | Parsons et al. | 224/251 |
| 5,813,162 | 9/1998 | Tse et al. | 43/21.2 |

*Primary Examiner*—Michael J. Carone
*Assistant Examiner*—Judith A. Nelson
*Attorney, Agent, or Firm*—Norman B. Rainer

[57] ABSTRACT

A fishing rod holder useful in securing a fishing rod to a boat, pier or other support structure includes an elongated tubular housing and a bracket upon which the housing may be removably seated. The bracket has a shepherd's hook upper configuration useful for gripping horizontal support structures. The housing has a pair of axially spaced apart first eyelets which hold straps useful in securing the rod holder to vertical support structures.

9 Claims, 2 Drawing Sheets

MULTI-FUNCTIONAL FISHING ROD HOLDER

BACKGROUND OF THE INVENTION

1. Field of the Invention

This invention relates to fishing rod holders, and more particularly concerns a fishing rod holder which can be secured to docks, piers or boats.

2. Description of the Prior Art

In many fishing situations, whether from shore, boat or pier, long durations of holding a fishing rod can be very tiring. Numerous rod-holding devices have earlier been disclosed which hold the fishing rod in an upright position while permitting immediate removal by the fisherman. However, the rod holder must in turn be secured in a releasible manner to some supporting structure. The most suitable and prevalent supporting structures generally associated with fishing situations are the horizontal and vertical structure elements of a fishing pier or dock, or the horizontally disposed gunwale or upper deck railing of a boat.

U.S. Pat. No. 4,517,761 to Bleggi discloses a fishing rod holder comprised of a piece of wire bent to a specialized configuration that engages a boat railing upraised from the gunwale of a boat.

U.S. Pat. No. 5,163,652 to King concerns a rod holder having a clamp mechanism specifically designed to engage the extruded gunwale of an aluminum boat.

U.S. Pat. No. 5,210,971 to Efantis relates to a fishing rod holder having threaded clamping means for securement to a horizontally disposed shelf.

U.S. Pat. No. 5,560,137 to Herring concerns a fishing rod holder assembly having a plurality of alternatively employed separate clamping means for securement to various structures such as the arm rail of a wheel chain.

U.S. Pat. No. 5,561,937 to Johnson discloses a fishing rod holder equipped with a securing strap adapted to embrace an underlying boat railing of circular circumference.

U.S. Pat. No. 5,632,112 to Steinborn relates to a fishing rod holder having threaded clamping means to facilitate attachment to the horizontal planks of a fishing pier.

As the aforesaid patents indicate, prior fishing rod holders have usually been designed for securement to just one kind of support structure. In those instances where versatility has been sought, the rod holder is either of complex, expensive construction or is of bulky size, or is difficult to use. Certain earlier securement means for fishing rod holders, especially those utilizing threaded tightening means for clamping mechanisms, are limited in terms of the size and shape of support structure that can be engaged. Furthermore, any metal components of a fishing rod holder, such as threaded lock screws and nuts are susceptible to the corrosive effects of sea water. It is also to be noted that none of the rod holders in the aforesaid Patents provide for the quick release of the rod holder from the support structure for emergency situations.

It is accordingly an object of the present invention to provide a fishing rod holder having securing means for engagement of vertical or horizontal support structures.

It is another object of this invention to provide a fishing rod holder as in the foregoing object which does not require the use of clamping mechanisms or threaded lock screws.

It is a further object of the present invention to provide a fishing rod holder of the aforesaid nature wherein the support structures engageable by said securing means may be of varied size and shape.

It is still another object of this invention to provide a fishing rod holder of the aforesaid nature which can be quickly released from said support structure to cope with emergency situations.

It is yet another object of the present invention to provide a fishing rod holder of the aforesaid nature of corrosion-resistant simple construction amenable to low cost manufacture.

These objects and other objects and advantages of the invention will be apparent from the following description.

SUMMARY OF THE INVENTION

The above and other beneficial objects and advantages are accomplished in accordance with the present invention by a fishing rod holder comprising:

a) a tubular housing elongated upon a center axis between a bottom extremity and open top extremity, and further defined by an interior surface of circular cylindrical contour and concentric exterior surface of circular cylindrical contour, b) a pair of axially spaced apart first eyelet means mounted to said exterior surface and providing passageways that are directed orthogonally with respect to said axis, c) a pair of axially spaced apart second eyelet means mounted to said exterior surface at sites diametrically opposite said first eyelet means and providing passageways that are directed co-extensively with said axis, and d) a bracket member comprised of a straight rigid strip extending between upper and lower extremities and bounded by, opposed front and rear surfaces, a pair of upwardly directed seating means associated with said front surface and adapted to engage said second eyelet means by virtue of downward movement of said housing, and a securing loop extending downwardly from said upper extremity in facing relationship with said rear surface.

In preferred embodiments, removable locking means are provided which prevent inadvertent removal of the housing seated upon said bracket member. Securing straps of adjustable length may be furnished in association with said first eyelet means.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
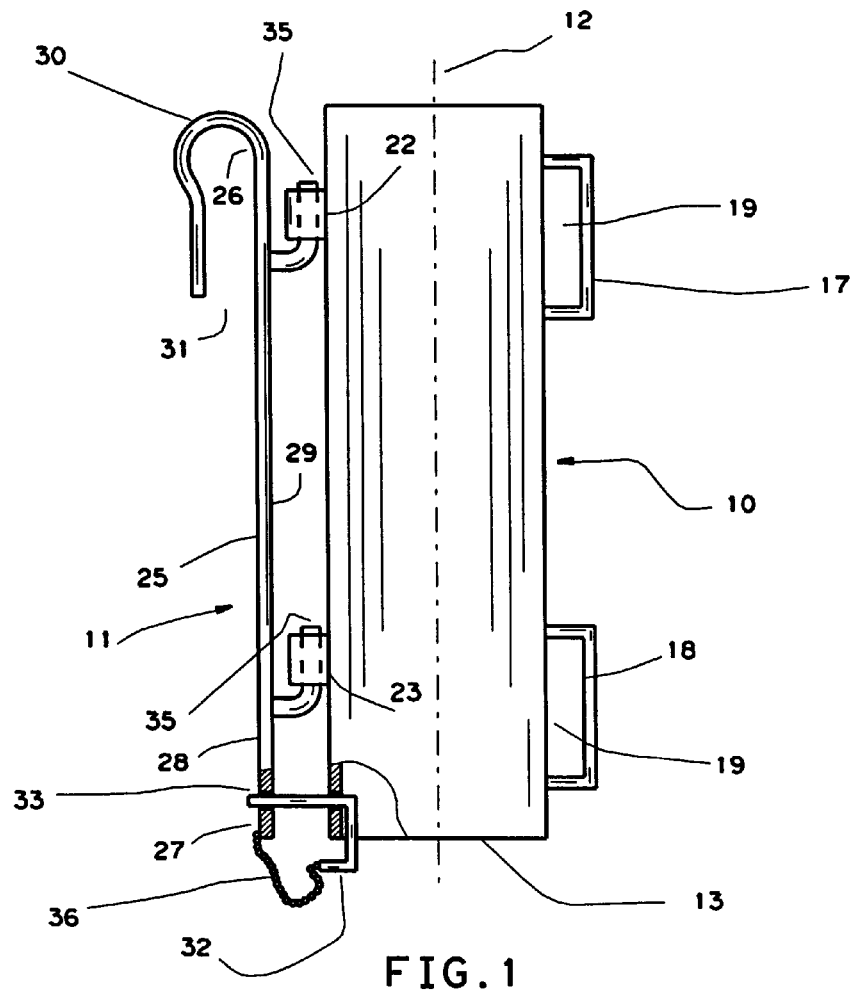
FIG. 1 is a side view of the embodiment of the rod holder of the present invention.
Figure 2:
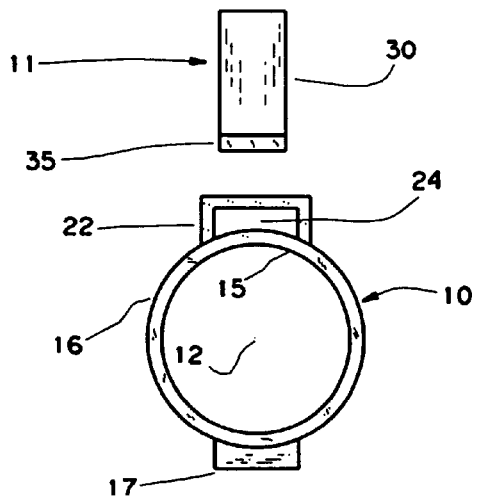
FIG. 2 is an exploded top view of the embodiment of FIG. 1.
Figure 3:
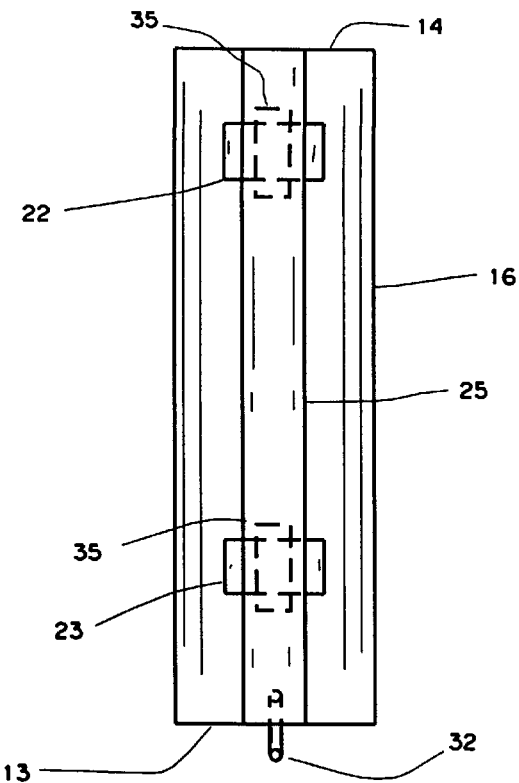
FIG. 3 is a front view taken from the left of FIG. 1.
Figure 4:
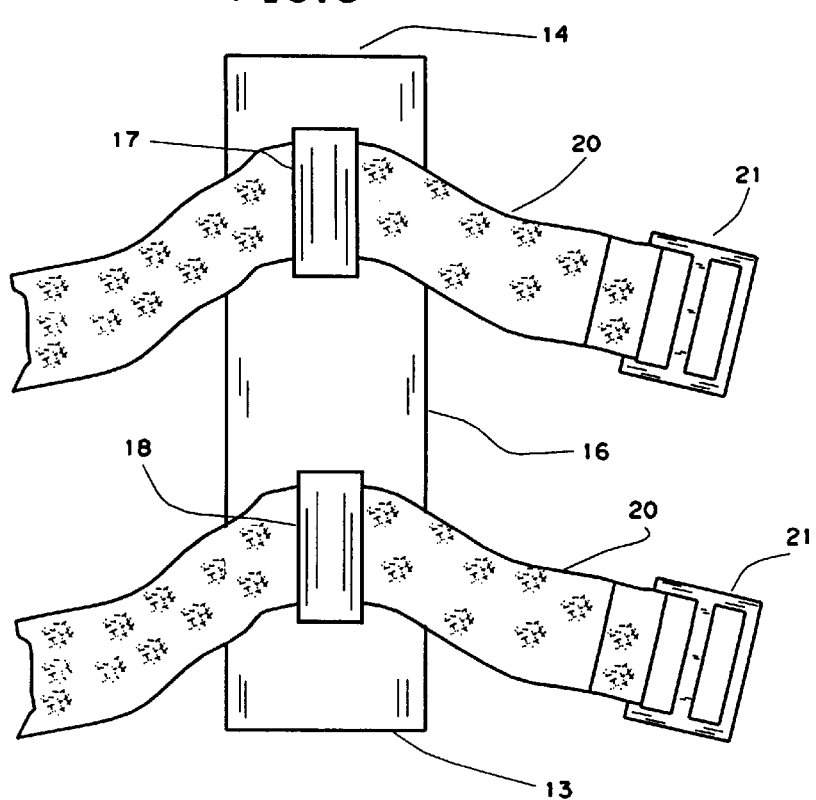
FIG. 4 is a rear view taken from the right of FIG. 1.

Referring to FIGS. 1–4, an embodiment of the fishing rod holder of the present invention is shown comprised of tubular housing 10 and releasibly engaged bracket member 11.

Housing 10 is elongated upon center axis 12 between bottom extremity 13 and open top extremity 14. Housing 10 is further defined by interior surface 15 of circular cylindrical contour and exterior surface 16, also of circular cylindrical contour, and concentric with respect to axis 12 and interior surface 15. Said housing may consist of a piece of plastic pipe of heavy wall thickness. The pipe may suitably be fabricated of rigid polyvinyl chloride (PVC), and may have a length between about 9 and 14 inches, an inside diameter between about 1 ½" and 2", and a wall thickness between about 2/16" and 3/16".

Axially spaced apart upper and lower first eyelet means 17 and 18, respectively, are associated with exterior surface 16. Said association may be either by way of attachment to said exterior surface, or as integral components of a monolithic molded structure that includes said housing. Said first eyelet means provide passageways 19 that are directed orthogonally with respect to axis 12. The exemplified passageways 19 are of elongated slot-like configuration, adapted to accommodate tether means in the form of securing straps 20. Other shapes of passageways 19 may be utilized to accommodate other types of is tether means such as ropes. However, use of straps is preferable because of the relative ease of tightening straps upon a vertical support member by use of adjustment buckles 21.

Axially spaced apart upper and lower second eyelet means 22 and 23, respectively, are associated with exterior surface 16 at sites diametrically opposite said first eyelet means. As in the case of said first eyelet means, the association of said second eyelet means with said exterior surface may be by way of attachment or as integral components of a monolithic molded structure including said housing. Said second eyelet means provide passageways 24 that are directed co-extensively with axis 12. Although the exemplified passageways 24 are of elongated slot-like configuration, other configuration may be useful.

Bracket member 11 is comprised of a straight rigid strip 25 extending between upper and lower extremities 26 and 27, respectively, and further defined by opposed front and rear surfaces 28 and 29, respectively. A pair of upwardly directed seating means in the form of tabs 35 is associated with said front surface and adapted to engage said second eyelet means by virtue of downward movement of said housing. Accordingly, seating means 35 are shaped and dimensioned so as to make close-fitting sliding engagement with said second eyelet means.

Associated with upper extremity 26 of said bracket member is a securing loop 30, preferably in the form of a shepherd's crook having a downwardly directed constrictive passage 31 disposed in association with front surface 28. Securing loop 30 is preferably a continuous integral extension of strip 25, having been formed by a bending operation. Bracket member 11 is preferably fabricated from metal sheet stock.

When employed in engagement with a horizontal structural support such as the railing or gunwale of a boat or a pier railing, loop 30 is caused to engage said structural support, and housing 10 is seated upon bracket member 11. A locking pin 32 may be inserted through accommodating apertures 33 to prevent inadvertent removal of the housing from said bracket member. However, when said locking pin is not utilized, the housing can be lifted quickly away from said bracket member to cope with emergency situations. Said locking pin may be attached to the bottom of bracket member 11 by way of a short tether 36, suitably a chain or string.

When employed in engagement with a vertical structural support such as the railing posts of a pier, securing straps 20 are deployed to embrace said posts, and are tightened by way of buckles 21.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A fishing rod holder comprising:
  a) a tubular housing elongated upon a center axis between a bottom extremity and open top extremity, and further defined by an interior surface of circular cylindrical contour and concentric exterior surface of circular cylindrical contour,
  b) a pair of axially spaced apart first eyelet means mounted to said exterior surface and providing passageways that are directed orthogonally with respect to said axis,
  c) a pair of axially spaced apart second eyelet means mounted to said exterior surface at sites diametrically opposite said first eyelet means and providing passageways that are directed co-extensively with said axis, and
  d) a bracket member comprised of a straight rigid strip extending between upper and lower extremities and bounded by opposed front and rear surfaces, a pair of upwardly directed seating means associated with said front surface and adapted to engage said second eyelet means by virtue of movement in the axial direction, and a securing loop extending downwardly from said upper extremity in facing relationship with said rear surface.

2. The rod holder of claim 1 further having removable locking means for preventing inadvertent removal of said housing from seated disposition upon said bracket member.

3. The rod holder of claim 2 wherein said locking means is a pin that penetrates aligned holes in said housing and bracket member.

4. The rod holder of claim 1 further comprising straps of adjustable length secured by said first eyelet means.

5. The rod holder of claim 1 wherein said housing is a monolithic structure formed of plastic by way of a molding operation and wherein said first and second eyelet means are continuous integral extensions of said exterior surface.

6. The rod holder of claim 1 wherein said housing is fabricated from a length of tubing, and said first and second eyelet means are separately attached to the exterior surface of said tubing.

7. The rod holder of claim 1 wherein said bracket member is fabricated from sheet metal stock.

8. The rod holder of claim 7 wherein said seating means are attached to said front surface.

9. The rod holder of claim 7 wherein said seating means are continuous integral extensions of said sheet metal, having been formed by cutting and bending operations.

* * * * *